(12) United States Patent
Hu et al.

(10) Patent No.: US 10,009,942 B2
(45) Date of Patent: Jun. 26, 2018

(54) RRC STATE TRANSITION TECHNIQUES WITH REDUCED SIGNALING OVERHEAD

(71) Applicant: Apple Inc., Cupertino, CA (US)

(72) Inventors: Haijing Hu, Beijing (CN); Huarui Liang, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/032,166

(22) PCT Filed: Sep. 30, 2015

(86) PCT No.: PCT/CN2015/091173
§ 371 (c)(1),
(2) Date: Jun. 13, 2016

(87) PCT Pub. No.: WO2017/054154
PCT Pub. Date: Apr. 6, 2017

(65) Prior Publication Data
US 2017/0094711 A1    Mar. 30, 2017

(51) Int. Cl.
*H04W 72/00* (2009.01)
*H04W 76/04* (2009.01)
(Continued)

(52) U.S. Cl.
CPC ..... *H04W 76/046* (2013.01); *H04W 36/0055* (2013.01); *H04W 74/0833* (2013.01);
(Continued)

(58) Field of Classification Search
CPC ........... H04W 74/0833; H04W 76/046; H04W 76/06; H04W 76/04; H04W 76/043; H04W 76/066
See application file for complete search history.

(56) References Cited

U.S. PATENT DOCUMENTS

2012/0033613 A1* 2/2012 Lin ............... H04W 74/085
                                                 370/328
2013/0051338 A1   2/2013 Ryu et al.
(Continued)

FOREIGN PATENT DOCUMENTS

CN  101242645  8/2008
CN  103858512  6/2014
(Continued)

OTHER PUBLICATIONS

International Search Report and Written Opinion for PCT/CN2015/091173, dated Jun. 14, 2016, pp. 1-11.

*Primary Examiner* — Kathy Wang-Hurst
*Assistant Examiner* — Said Elnoubi
(74) *Attorney, Agent, or Firm* — Meyertons Hood Kivlin Kowert & Goetzel, P.C.; Jeffrey C. Hood (57) ABSTRACT

This disclosure relates to techniques for establishing radio resource control connections between wireless devices and cellular networks. According to some embodiments, a wireless device and a cellular base station may establish a radio resource control (RRC) connection. The wireless device may indicate to the cellular base station to store access stratum context information associated with the wireless device after the RRC connection is released. The wireless device may also store access stratum context information associated with the cellular base station. The stored access stratum context information may be used in conjunction with a subsequent RRC connection establishment procedure between the wireless device and the cellular base station.

20 Claims, 5 Drawing Sheets

(51) Int. Cl.
*H04W 74/08* (2009.01)
*H04W 36/00* (2009.01)
*H04W 76/02* (2009.01)
*H04W 76/06* (2009.01)
*H04W 88/02* (2009.01)
*H04W 88/08* (2009.01)

(52) U.S. Cl.
CPC ....... *H04W 76/028* (2013.01); *H04W 76/068* (2013.01); *H04W 88/02* (2013.01); *H04W 88/08* (2013.01)

(56) References Cited

U.S. PATENT DOCUMENTS

| | | | |
|---|---|---|---|
| 2013/0260811 A1* | 10/2013 | Rayavarapu | H04W 76/028 455/509 |
| 2015/0118993 A1* | 4/2015 | Rune | H04W 12/08 455/410 |
| 2015/0312957 A1 | 10/2015 | Pelletier et al. | |
| 2015/0359018 A1* | 12/2015 | Li | H04W 76/021 370/329 |
| 2016/0135247 A1 | 5/2016 | Ozturk et al. | |
| 2016/0212638 A1* | 7/2016 | Jain | H04W 52/0258 |
| 2016/0234877 A1* | 8/2016 | Bangolae | H04W 76/046 |

FOREIGN PATENT DOCUMENTS

| | | |
|---|---|---|
| CN | 103945537 | 7/2014 |
| CN | 104247553 | 12/2014 |
| EP | 2922364 A1 | 9/2015 |

* cited by examiner

RRC STATE TRANSITION TECHNIQUES WITH REDUCED SIGNALING OVERHEAD

FIELD

The present application relates to wireless devices, including to apparatuses, systems, and methods for a wireless device to perform radio resource control (RRC) state transitions with reduced signaling overhead.

DESCRIPTION OF THE RELATED ART

Wireless communication systems are rapidly growing in usage. Further, wireless communication technology has evolved from voice-only communications to also include the transmission of data, such as Internet and multimedia content. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

As the number of wireless devices increases, the amount of control signaling performed in wireless communication systems may also potentially increase. This may in turn represent an increasing burden on both radio resources and network node processsing load. Accordingly, improvements in the field would be desirable.

SUMMARY

Embodiments are presented herein of apparatuses, systems, and methods for wireless devices to transition between radio resource control (RRC) states in a manner that limits control signaling overhead and network node processing load.

According to the techniques described herein, a wireless device may indicate to a base station when establishing an RRC connection to store access stratum context information for the wireless device after releasing the RRC connection. The wireless device, the base station, and possibly one or more additional network nodes may accordingly store access stratum context information for the wireless device after the RRC connection is released.

Upon subsequently attempting to establish an RRC connection with the same base station, the wireless device, the base station, and the network nodes may be able to re-use the stored access stratum context information. This may allow for a simplified RRC connection establishment procedure between the wireless device and the base station, such as by foregoing security procedures. This may in turn reduce the amount of signaling overhead and the processing load on the network side, in particular as the number of RRC state transitions between a wireless device and a given base station increases.

Such techniques may be useful for stationary wireless devices and/or devices that perform machine type communication, for example if such devices perform frequent small data transmissions and often or always communication with the same network infrastructure equipment. Such techniques may also or alternatively be useful more generally (e.g., for mobile wireless devices and/or devices with diverse data communication patterns), according to various embodiments.

The techniques described herein may be implemented in and/or used with a number of different types of devices, including but not limited to cellular phones, tablet computers, wearable computing devices, portable media players, cellular base stations and other cellular network infrastructure equipment, servers, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure:

UE: User Equipment
BS: Base Station
RAT: Radio Access Technology
3GPP: Third Generation Partnership Project
3GPP2: Third Generation Partnership Project 2
GSM: Global System for Mobile Communication
UMTS: Universal Mobile Telecommunication System
LTE: Long Term Evolution
RRC: Radio Resource Control
RACH: Random Access Channel PRACH: Physical Random Access Channel
RNTI: Radio Network Temporary Identifier
RA-RNTI: Random Access RNTI
C-RNTI: Cell RNTI
TC-RNTI: Temporary Cell RNTI
TMSI: Temporary Mobile Subscriber Identity
S-TMSI: System Architecture Evolution TMSI Terms The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Cell—The term "cell" as used herein may refer to an area in which wireless communication services are provided on a radio frequency by a cell site or base station. A cell may be identified in various instances by the frequency on which the cell is deployed, by a network (e.g., PLMN) to which the cell belongs, and/or a cell identifier (cell id), among various possibilities.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
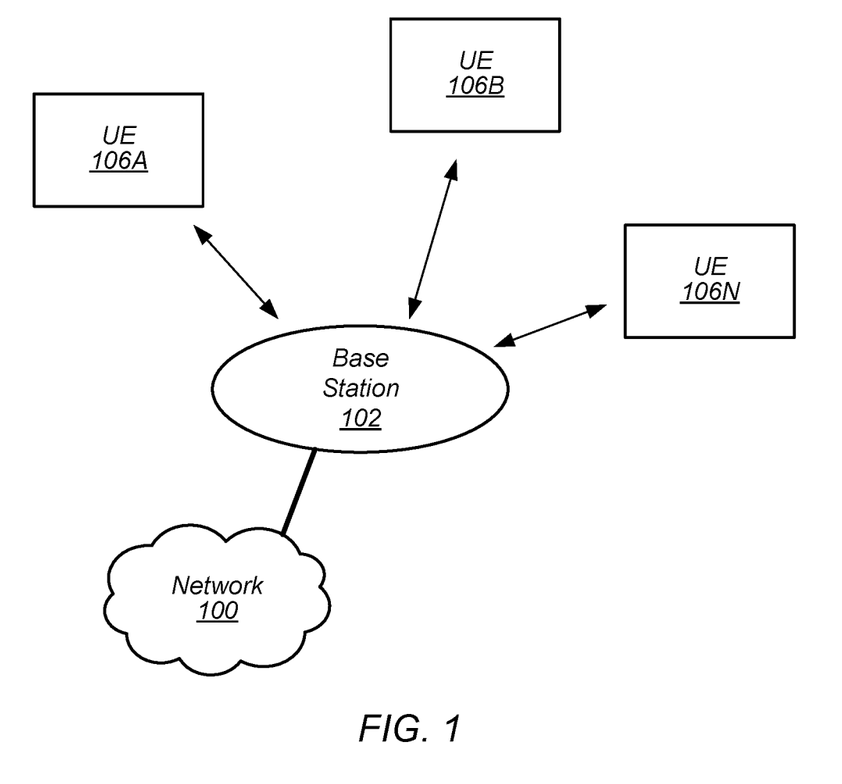
FIG. 1 illustrates an exemplary (and simplified) wireless communication system.
Figure 2:
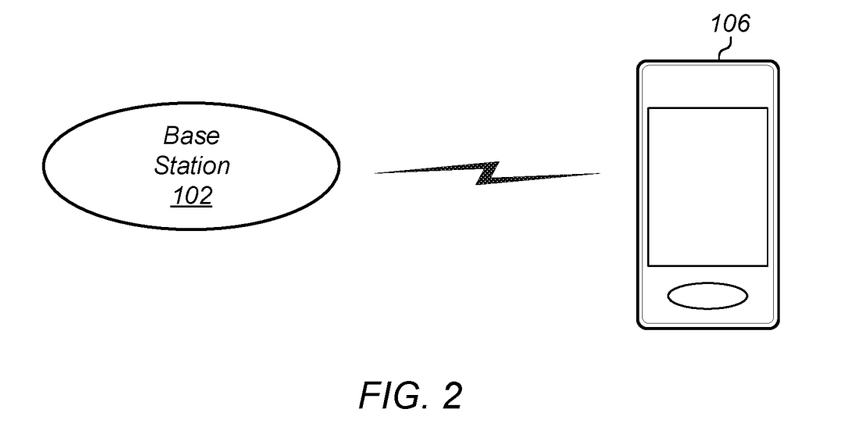
FIG. 2 illustrates an exemplary base station (BS) in communication with an exemplary wireless user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more (e.g., an arbitrary number of) user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. If the base station 102 is implemented in the context of LTE, it may alternately be referred to as an 'eNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The communication area (or coverage area) of the base station may be referred to as a "cell." The base station 102 and the UEs 106 may be configured to communicate over the transmission medium using any of various radio access technologies (RATs), wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple RATs. For example, the UE 106 may be configured to communicate using two or more of GSM, UMTS, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
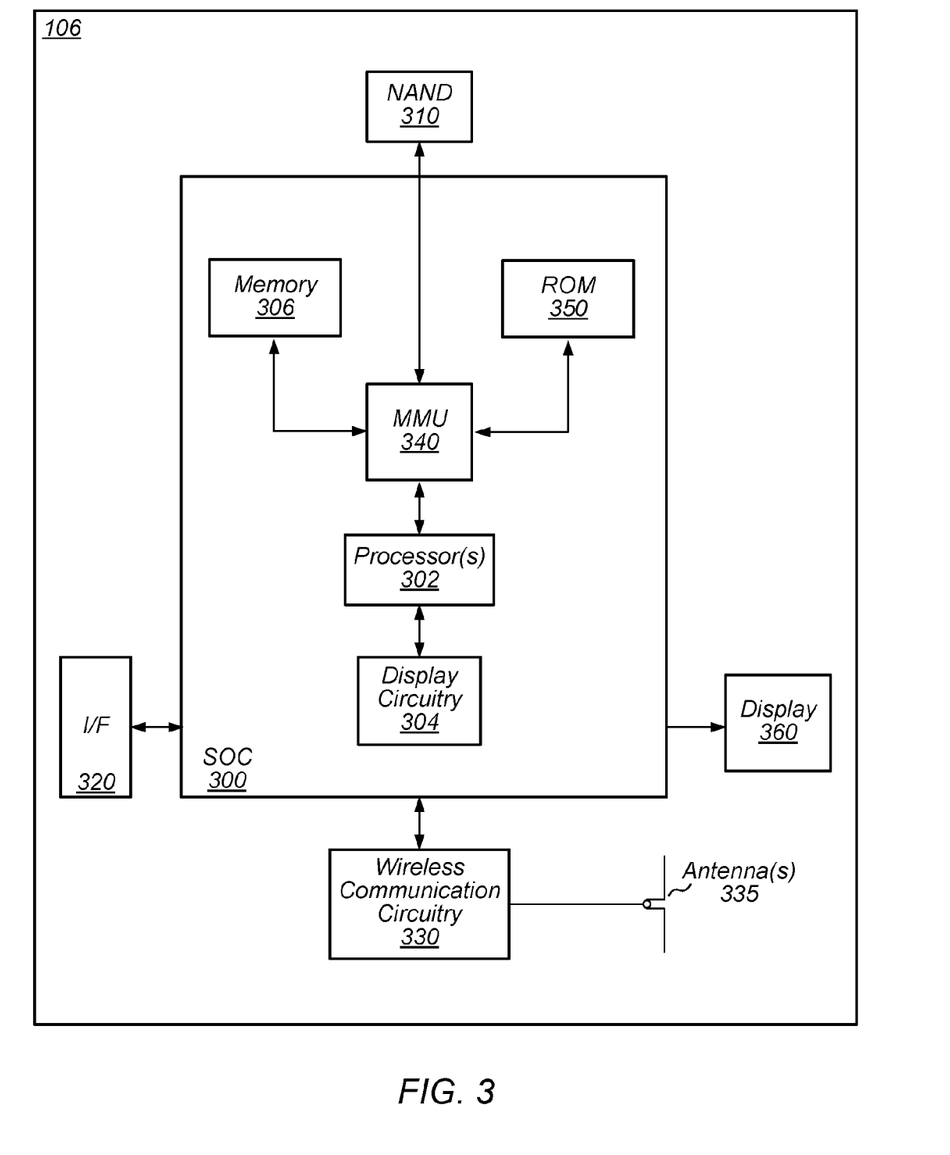
FIG. 3 illustrates an exemplary block diagram of a UE device, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

As noted above, the UE 106 may be configured to communicate wirelessly using multiple wireless communication technologies. As further noted above, in such instances, the wireless communication circuitry 330 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 335 to perform the wireless communication.

As described further subsequently herein, the UE 106 may include hardware and/or software components for implementing features for transitioning between RRC states, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
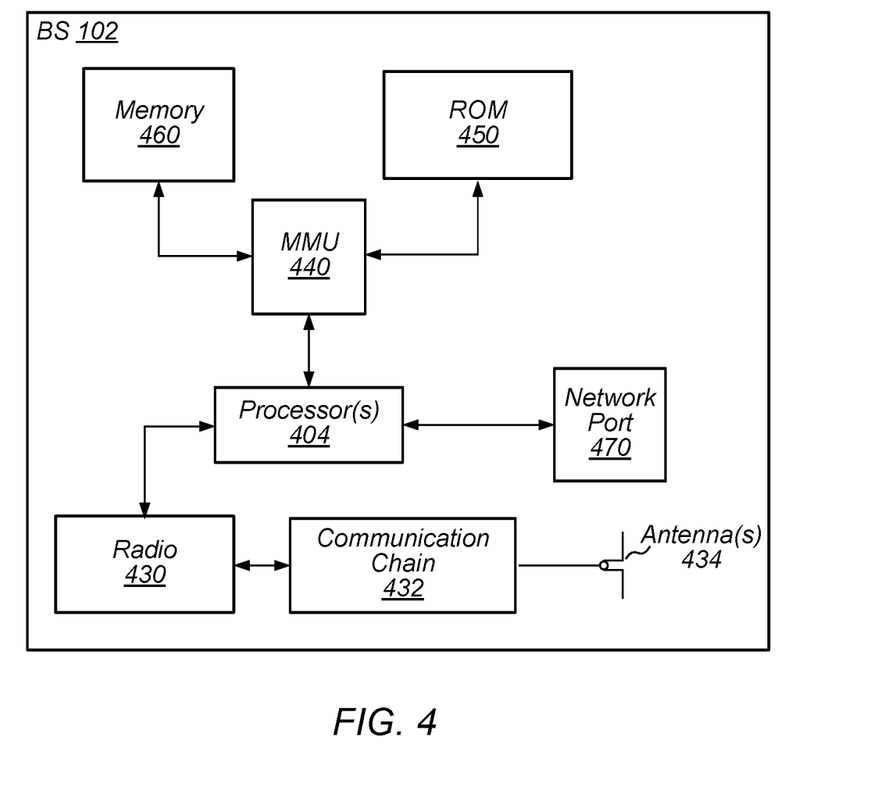
FIG. 4 illustrates an exemplary block diagram of a BS, according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
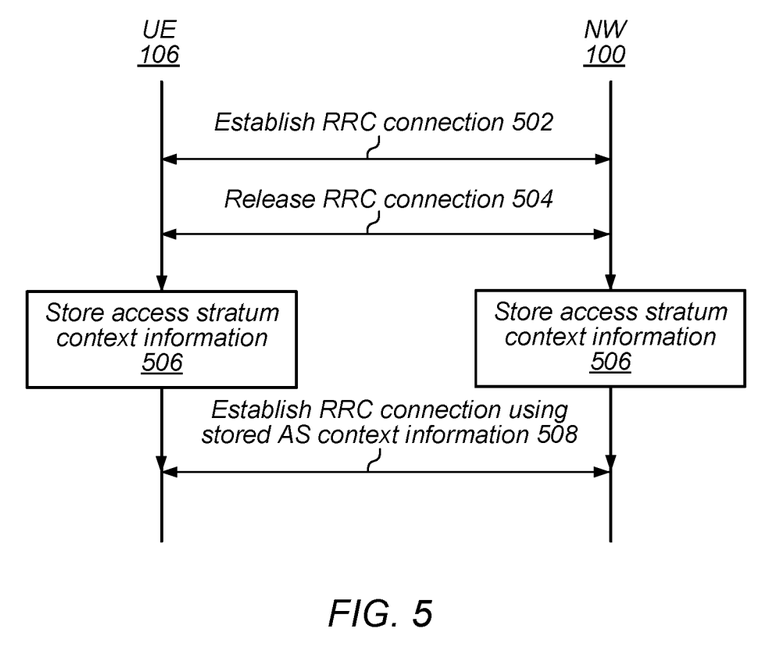
FIG. 5 is a signal flow diagram illustrating an exemplary method for a UE device to perform radio resource control state transitions with reduced control signaling overhead, according to some embodiments.

FIG. 5—Signal Flow Diagram

FIG. 5 is a signal flow diagram illustrating a method for a wireless device (e.g., a wireless user equipment (UE) device such as illustrated and described with respect to FIGS. 1-3) and a base station (e.g., a base station (BS) such as illustrated and described with respect to FIGS. 1-2 and 4) to perform radio resource control (RRC) state transitions with reduced signaling overhead. The method shown in FIG.

5 may be used in conjunction with any of the computer systems or devices shown in the above Figures, among other devices. In various embodiments, some of the method elements shown may be performed concurrently, in a different order than shown, substituted for by other method elements, or may be omitted. Additional method elements may also be performed as desired. As shown, this method may operate as follows.

In 502, a UE device 106 and a cellular network 100 may establish a ("first") RRC connection. The RRC connection may be established by communication between the UE 106 and a base station (e.g., that provides a serving cell for the UE 106), and possibly one or more additional cellular network nodes, such as a mobility management entity (MME) and/or serving gateway (SGW). For example the UE device 106 may perform a random access channel (RACH) procedure to establish the RRC connection.

The RACH procedure may include exchanging certain messages between the UE 106 and the base station. For example, the messages may include a PRACH preamble, a random access response (RAR), a RRC connection request, and a contention resolution message, such as further described herein with respect to FIG. 6. Other techniques for establishing an RRC connection (including variations on or alternatives to a RACH procedure) are also possible.

At least in some instances, as part of establishing the RRC connection, the UE device 106 may provide an indication to the network 100 to store access stratum context information for the UE device 106 after the RRC connection is released. Such an indication may be provided in any of various ways, such as by using a specific PRACH preamble (e.g., selected from a set of PRACH preambles agreed upon by the UE device 106 and the network 100 as indicating to store access stratum context information for the UE device 106) or by including a cause code as part of the RRC connection request message defined as indicating to store access stratum context information for the UE device 106.

Note that the indication to store access stratum context information for the UE device 106 after the RRC connection is released may be explicit or implicit. For example, the indication to store access stratum context information for the UE 106 may be implied as part of an indication that the UE device 106 intends to perform a specific type of communication and/or is a specific type of UE device 106, among various possibilities. As one such possibility, if the UE 106 intends to perform frequent small data transmissions (e.g., machine type communication) and/or is a class of device that typically or always performs such a type of communication, a cause code and/or PRACH preamble (or other mechanism) may indicate this, and the UE device 106 and the network 100 may each be configured to store access stratum context information for the UE device 106 based on such an indication of a type of device and/or type of communication for which the RRC connection is being established.

The UE 106 and the network 100 may communicate data (e.g., including uplink data transmitted from the UE 106 to the network 100 and/or downlink data transmitted from the network 100 to the UE 106) using the established RRC connection. The data may include application data associated with an application executing on the UE 106, as one possibility. In some embodiments, the application may be a sensing or measuring application, which occasionally (e.g., periodically) or continuously performs one or more sensing or measuring operations, and communicates data obtained from the sensing or measuring operation(s) by way of a network connection provided by the network 100. In other embodiments, the application may be any of various other (e.g., web browser, game, email, messaging, productivity, etc.) types of applications, and/or the data communicated with the network 100 may include other types of data.

In 504, the RRC connection may be released by the UE 106 and the network 100. The RRC connection may be released when there is currently no further data to be communicated between the UE 106 and the network 100, as one possibility.

In 506, both the UE 106 and the network 100 (e.g., including one or more of a base station, mobility management entity, and/or serving gateway serving the UE 106) may store access stratum context information for the UE 106 after the RRC connection is released.

The stored access stratum context information may include information that may facilitate more rapid subsequent RRC connection establishment procedures. The access stratum context information stored may differ for each of the UE device 106 and the entities of the network 100, at least in some embodiments. For example, the UE device 106 may store Uu context information, security information, and/or data radio bearer information, among various possible access stratum context information applicable to the UE device 106. The base station serving the UE device 106 may also store Uu context information, security information, and/or data radio bearer information for the UE device 106, and may also store S1 context information and/or S1 bearer information, among various possible access stratum context information. As another example, the MME associated with the UE device 106 may store S1-MME context information for the UE device 106; similarly, the SGW associated with the UE device 106 may store S1-U bearer information for the UE device 106.

In 508, the UE 106 and the network 100 may subsequently establish another ("second") RRC connection.

The base station serving the UE 106 may determine whether it has access stratum context information for the UE 106 stored. If the base station does have access stratum context information for the UE 106 stored, the stored information may be used for the RRC connection establishment procedure.

Utilizing the stored information may allow for the UE 106 and the network 100 to perform a simplified RRC connection establishment procedure. For example, by using stored access stratum context information, it may (at least in some instances) be possible to forego security procedures for the UE 106, and/or avoid other aspects of RRC connection establishment.

Note that at least in some embodiments, if the base station serving the UE 106 does not have access stratum context information for the UE 106 stored (e.g., if the UE 106 is not attempting to establish an RRC connection with a base station with which it has previously established an RRC connection or if the UE 106 did not previously indicate to store access stratum context information for the UE 106 in conjunction with any previous RRC connection with the base station), the base station and the UE 106 may perform the RRC connection establishment procedure with normal control signaling and security procedures. Thus, at least in some instances, the techniques described herein may reduce the control signaling and/or network node processing loads associated with RRC state transitions.

As noted above, storing access stratum context information may be particularly useful, at least in some embodiments, for wireless devices that are performing frequent small data communications. In many instances, such devices may be deployed in stationary implementations or implementations with limited mobility, such that the wireless device may mostly or always communicate with a network by way of the same network infrastructure equipment (e.g., serving base station, MME, SGW, etc.). Accordingly, in some instances, it may be preferable that stored access stratum context information be stored indefinitely, e.g., to allow for simplified RRC connection establishment procedures by the wireless device each time the wireless device transitions to the RRC connected state after an initial RRC connection procedure.

Alternatively, it may be preferable in some instances for stored access stratum context information to eventually expire and be discarded, for example in case a wireless device is removed from a stationary deployment and/or moved to a new location. As one possibility for facilitating this, in some embodiments the UE 106 and/or one or more nodes (e.g., base station, MME, SGW) of the network 100 may utilize one or more timers associated with stored access stratum context information. For example, when the network 100 and the UE device 106 store access stratum context information after release of an RRC connection, one or more of the nodes could initiate a timer associated with the access stratum context information upon release of the RRC connection. If a new RRC connection between the UE device 106 and the network 100 is established before expiration of the timer, the stored access stratum context information may be used as part of the RRC connection establishment procedure, and the timer may be re-set when the new RRC connection is released. If the timer expires, one or more of the nodes may discard its stored access stratum context information. In this case, previously stored access stratum context information may not be available for the next RRC connection attempt by the UE device 106. This may help prevent unnecessary storage of stale access stratum context information by wireless devices and/or network nodes, which may improve overall resource usage efficiency.

Figure 6:
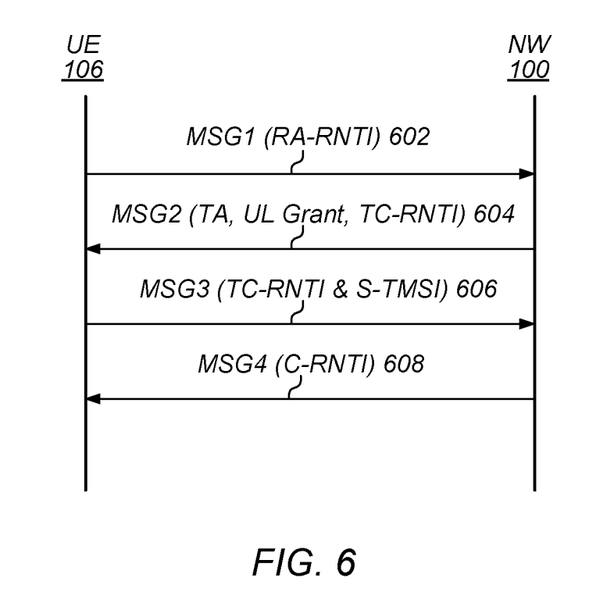
FIG. 6 is a signal flow diagram illustrating an exemplary RACH procedure, according to some embodiments.

FIG. 6—Exemplary RACH Procedure

FIG. 6 is a signal flow diagram illustrating an exemplary idle-mode RACH procedure such as might be performed between a UE 106 and a network 100 according to LTE. It should be noted while the exemplary details illustrated in and described with respect to FIG. 6 may be representative of one possible connected mode transition procedure technique, other techniques for transitioning from idle to connected mode (e.g., according to other RATs) are also possible. Accordingly, the features of FIG. 6 are not intended to be limiting to the disclosure as a whole: numerous variations and alternatives to the details provided herein below are possible and should be considered within the scope of the disclosure.

A RACH procedure may be a contention-based procedure for acquiring synchronization and establishing communication channels and/or radio links which provide access to more extensive network resources (e.g., data carrying channels and/or greater uplink/downlink bandwidth). A UE device may attempt to perform a RACH procedure in order to obtain an RRC connection, which may in turn be used to service an application data request, at least as one possibility.

As shown, in 602 the UE 106 may transmit a first message to the network 100. The first message ("Msg1") may include a PRACH preamble, including a random access radio network temporary identifier (RA-RNTI).

In 604, the UE 106 may receive a second message from the network 100. The second message ("Msg2", also referred to as "random access response" or "RAR") may include a timing advance (TA) parameter, a temporary cell radio network temporary identifier (TC-RNTI), and an uplink grant for transmitting a third message.

In 606, the UE 106 may transmit the third message to the network 100. The third message ("Msg3", also referred to as "RRC connection request") may include the TC-RNTI and a system architecture evolution temporary mobile subscriber identity (S-TMSI) to identify the UE 106 to the network 100.

In 608, the UE 106 may receive a fourth message from the network 100. The fourth message ("Msg4" or "contention resolution message") may promote the TC-RNTI to a cell radio network temporary identifier (C-RNTI). The C-RNTI may be used for subsequent connected-mode RACH attempts, among various uses, as desired.

Upon completion of the four message sequence, the UE 106 may be in a connected mode (e.g., RRC_connected) with the network 100, and may perform network data exchange via its serving cell.

Figure 7:
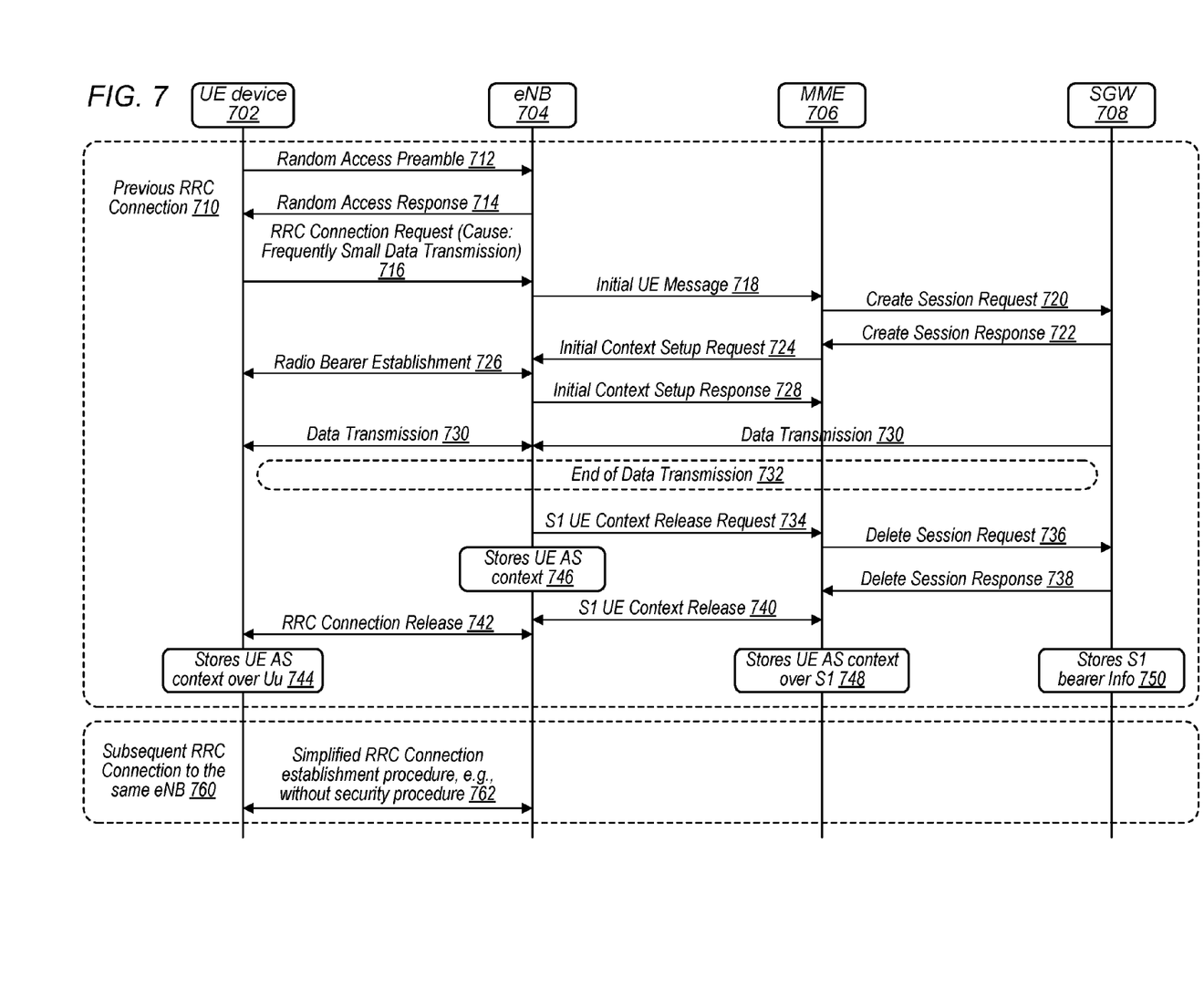
FIG. 7 is a signal flow diagram illustrating possible further exemplary details of a method for a UE device to perform radio resource control state transitions with reduced control signaling overhead, according to some embodiments.

FIG. 7—Detailed RRC State Transition Signal Flow Diagram

As cellular communication technologies evolve, an increasing number of cellular communication capable devices are expected to be deployed. This may in turn require a potentially significant increase in support for connected devices per unit area.

Further, one of the reasons for the continuing increase in the numbers of devices includes the development and spread of devices performing machine type communication (MTC). Such devices, which may include stationary deployed devices, wearable devices, and/or other devices forming part of the "Internet of Things" may commonly be designed to perform frequent and/or periodic small data transmissions.

One potential impact of increasing numbers of connected devices, including of MTC devices, may include more RRC state transitions (and possibly more frequent RRC state transitions). Frequent RRC connection setup/release cycles may cause a significant amount of control signaling, both over radio access network and core network interfaces. Frequent RRC connection setup/release cycles may also increase processing load in the network nodes.

As previously described with respect to FIG. 5, possible techniques for reducing such control signaling and processing load associated with RRC state transitions may include storing access stratum context information for a UE device (e.g., both by the UE device and by network nodes) between RRC connections by the UE device to simplify subsequent RRC connection procedures to the same base station. FIG. 7 illustrates possible further details of exemplary RRC state transition techniques that can result in reduced control signaling overhead. Note that FIG. 7 and the information provided herein below in conjunction therewith are provided by way of example of various considerations and details relating to possible systems (such as 3GPP based systems) with which the method of FIG. 5 may be implemented according to some embodiments, and are not intended to be limiting to the disclosure as a whole. Numerous variations and alternatives to the details provided herein below are possible and should be considered within the scope of the disclosure.

As shown, a UE device 702 may initially arrange a "previous" RRC connection 710 to an eNB 704. Establishing the "previous" RRC connection 710 may include the UE device 702 providing a random access preamble message 712 to the eNB 704. The eNB 704 may provide a random access response 714 to the UE device 702. The UE device 702 may then provide a RRC connection request 716 to the eNB 704, which may indicate that the cause for the RRC connection is to frequently perform small data transmissions. For example, a cause value specifically defined as indicating "frequent small data transmission" may be included in the RRC connection request.

The eNB 704 may exchange certain control signaling messages with a MME 706 and SGW 708 as part of the (e.g., legacy) RRC connection establishment procedure, including an initial UE message 718 provided from the eNB 704 to the MME 706. The MME 706 may in turn provide a create session request 720 to the SGW 708, which may provide a create session response 722 back to the MME 706. The MME 706 may provide an initial context setup request 724 to the eNB 704. The eNB 704 and the UE 702 may then perform radio bearer establishment 726, and the eNB 704 may provide an initial context setup response 728 to the MME 706. At this point, the "previous" RRC connection 710 may be established, and the UE device 702 may perform data transmission 730 by way of the eNB 704, MME 706, and SGW 708.

Once the data transmission is complete (732), the network and the UE 702 may release the RRC connection 710. As shown, this process may begin (at least in some instances) with the eNB 704 providing a UE context release request 734 to the MME 706. The MME 706 may in turn provide a delete session request 736 to the SGW 708, which may respond with a delete session response 738. The eNB 704 and MME 706 may release the S1 UE context (740), and the UE and the eNB may release the RRC connection (742).

Based on the indication that the cause for the RRC connection is to frequently perform small data transmissions, each of the UE 702 and the eNB 704 may store UE access stratum context information (744, 746). At some point during RRC connection setup (e.g., with the initial UE message 718) or release (e.g., with the S1 UE context release request 734, or with the S1 UE context release complete), the eNB 704 may indicate to the MME 706 that the UE 702 will frequently perform small data transmissions and/or may directly indicate to store UE access stratum context information, based on which the MME 706 may also store UE access stratum context information (748) (e.g., S1 context information). The MME 706 may also propagate the indication(s) that the UE 702 will frequently perform small data transmissions and/or that UE access stratum context information should be stored to the SGW 708, based on which the SGW 708 may also store UE access stratum context information (750) (e.g., S1 bearer information).

As shown, the UE device 702 may later arrange a "subsequent" RRC connection 760 to the same eNB 704. The eNB 704 may check whether access stratum context information for the UE 702 is stored; since in the exemplary scenario illustrated in FIG. 7 access stratum context information for the UE 702 is stored, establishing the "subsequent" RRC connection 760 may be a simplified RRC connection establishment procedure 762 relative to the "previous" RRC connection 710. For example, it may be possible to forego security procedures for the UE device 702, e.g., because of the stored access stratum context information. Thus, at least in some instances it may be possible to reduce or eliminate the signaling overhead between the eNB 704 and the other network nodes for the "subsequent" RRC connection procedure 760. Note that the simplified RRC connection establishment procedure 762 may still include exchange of random access preamble, random access response, RRC connection request, and contention resolution messages between the UE 702 and the eNB 704, at least in some embodiments. If access stratum context information for the UE 702 were not stored, the eNB 704 would perform a legacy RRC establishment procedure to establish the "subsequent" RRC connection 760.

In the following further exemplary embodiments are provided.

One set of embodiments may include an apparatus, comprising: a processing element configured to: establish a first radio resource control (RRC) connection with a cellular base station; communicate data with the cellular base station using the first RRC connection; release the first RRC connection with the cellular base station, wherein access stratum context information for the first RRC connection with the cellular base station is stored after releasing the first RRC connection; and establish a second RRC connection with the cellular base station using the stored access stratum context information.

According to some embodiments, to establish the first RRC connection, the processing element is further configured to: provide an indication to store access stratum context information for the first RRC connection after the first RRC connection is released to the cellular base station, wherein the indication causes the cellular base station to store access stratum context information for the first RRC connection after the first RRC connection is released.

According to some embodiments, the indication further causes one or more additional cellular network entities to store access stratum context information for the first RRC connection after the first RRC connection is released.

According to some embodiments, to establish the first RRC connection, the processing element is further configured to: provide a physical random access channel preamble to the cellular base station; receive a random access response from the cellular base station; provide a RRC connection request message to the cellular base station, wherein the RRC connection request message comprises an indication that the RRC connection is for frequent small data exchanges; and receive a contention resolution message.

According to some embodiments, to establish the first RRC connection, the processing element is further configured to: provide a physical random access channel (PRACH) preamble to the cellular base station, wherein the PRACH preamble is selected to indicate that the RRC connection is for frequent small data exchanges; receive a random access response from the cellular base station; provide a RRC connection request message to the cellular base station; and receive a contention resolution message.

According to some embodiments, the access stratum context information comprises one or more of: Uu context information; security information; data radio bearer information.

A further set of embodiments may include a wireless user equipment (UE) device, comprising: an antenna; a radio, operatively coupled to the antenna; and a processing element, operatively coupled to the radio; wherein the UE device is configured to: indicate to a cellular network to store access stratum context information associated with a radio resource control (RRC) connection with a cellular base station; store access stratum context information associated with the RRC connection with the cellular base station; and utilize stored access stratum context information when establishing a subsequent RRC connection with the cellular base station.

According to some embodiments, the UE device is further configured to indicate to the cellular network to store the access stratum context information by way of one or more of: inclusion of a specific cause value in an RRC connection request; or use of a specific physical random access channel preamble value.

According to some embodiments, utilizing the stored access stratum context information when establishing the subsequent RRC connection with the cellular base station reduces signaling overhead associated with establishing the subsequent RRC connection.

According to some embodiments, RRC connection establishment security procedures when establishing the subsequent RRC connection with the cellular base station are avoided by utilizing the stored access stratum context information.

According to some embodiments, the UE device is further configured to: determine that the stored access stratum context information has expired; and discard the stored access stratum context information.

A still further set of embodiments may include a cellular base station, comprising: an antenna; a radio, operatively coupled to the antenna; and a processing element, operatively coupled to the radio; wherein the cellular base station is configured to: receive a request to establish a first RRC connection from a wireless user equipment (UE) device, wherein the request to establish the first RRC connection comprises an indication to store access stratum context information associated with the UE device; and store access stratum context information associated with the UE device after the first RRC connection with the UE device is released based at least in part on the indication to store access stratum context information associated with the UE device.

According to some embodiments, the cellular base station is further configured to: receive a request to establish a second RRC connection from the UE device; determine that access stratum context information associated with the UE device is stored by the cellular base station; and utilize the stored access stratum context information associated with the UE device to establish the second RRC connection.

According to some embodiments, by utilizing the stored access stratum context information associated with the UE device to establish the second RRC connection (and potentially additional subsequent RRC connections), a RRC connection establishment procedure to establish the second RRC connection (and potentially additional subsequent RRC connections) is simplified relative to a RRC connection establishment procedure to establish the first RRC connection.

According to some embodiments, the cellular base station is further configured to: provide an indication to store access stratum context information associated with the UE device to one or more other cellular network entities based at least in part on the indication received from the UE device.

According to some embodiments, the stored access stratum context information comprises one or more of: Uu context information for the UE device; security information for the UE device; data radio bearer information for the UE device; S1-MME context information for the UE device; or S1-U bearer information for the UE device.

According to some embodiments, the indication to store access stratum context information associated with the UE device comprises inclusion of a cause value indicating that the UE device performs frequent small transmissions in a RRC connection request message received from the UE device.

According to some embodiments, the indication to store access stratum context information associated with the UE device comprises use of a physical random access channel (PRACH) preamble defined as indicating that the UE device performs frequent small transmissions.

According to some embodiments, the cellular base station is further configured to: initiate a timer associated with the stored access stratum context information associated with the UE device; and discard the stored access stratum context information associated with the UE device if the timer expires.

According to some embodiments, the cellular base station is further configured to: reset the timer based on each new RRC connection between the UE device and the cellular base station.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processing element configured to cause a user equipment device (UE) to:
establish a first radio resource control (RRC) connection with a cellular base station;
communicate data with the cellular base station using the first RRC connection;
release the first RRC connection with the cellular base station, wherein access stratum context information for the first RRC connection with the cellular base station is stored after releasing the first RRC connection;

provide an indication to the cellular base station to store access stratum context information for the first RRC connection after the first RRC connection is released with the cellular base station, wherein the indication causes the cellular base station to store access stratum context information for the first RRC connection after the first RRC connection is released; and establish a second RRC connection with the cellular base station using the stored access stratum context information, wherein RRC connection establishment security procedures when establishing the second RRC connection with the cellular base station are avoided by utilizing the stored access stratum context information for the first RRC connection with the cellular base station.

2. The apparatus of claim 1,
wherein the indication further causes one or more additional cellular network entities to store access stratum context information for the first RRC connection after the first RRC connection is released.

3. The apparatus of claim 1, wherein to establish the first RRC connection, the processing element is further configured to:
provide a physical random access channel preamble to the cellular base station;
receive a random access response from the cellular base station;
provide a RRC connection request message to the cellular base station, wherein the RRC connection request message comprises an indication that the RRC connection is for frequent small data exchanges; and
receive a contention resolution message.

4. The apparatus of claim 1, wherein to establish the first RRC connection, the processing element is further configured to:
provide a physical random access channel (PRACH) preamble to the cellular base station, wherein the PRACH preamble is selected to indicate that the RRC connection is for frequent small data exchanges;
receive a random access response from the cellular base station;
provide a RRC connection request message to the cellular base station; and
receive a contention resolution message.

5. The apparatus of claim 1, wherein the access stratum context information comprises one or more of:
Uu context information; and
data radio bearer information.

6. The apparatus of claim 1, wherein the access stratum context information comprises one or more of:
S1-MME context information; and
S1-U bearer information.

7. A method for operating a user equipment device (UE), the method comprising: by the UE device:
establishing a first radio resource control (RRC) connection with a cellular base station;
communicating data with the cellular base station using the first RRC connection;
releasing the first RRC connection with the cellular base station, wherein access stratum context information for the first RRC connection with the cellular base station is stored after releasing the first RRC connection;
providing an indication to the cellular base station to store access stratum context information for the first RRC connection after the first RRC connection is released with the cellular base station, wherein the indication causes the cellular base station to store access stratum context information for the first RRC connection after the first RRC connection is released; and establish a second RRC connection with the cellular base station using the stored access stratum context information, wherein RRC connection establishment security procedures when establishing the second RRC connection with the cellular base station are avoided by utilizing the stored access stratum context information for the first RRC connection with the cellular base station.

8. The method of claim 7, wherein the indication to the cellular base station to store access stratum context information for the first RRC connection further causes one or more additional cellular network entities to store access stratum context information for the first RRC connection after the first RRC connection is released.

9. The method of claim 7, the method further comprising:
providing a physical random access channel preamble to the cellular base station;
receiving a random access response from the cellular base station;
providing a RRC connection request message to the cellular base station, wherein the RRC connection request message comprises an indication that the RRC connection is for frequent small data exchanges; and
receiving a contention resolution message.

10. The method of claim 7, the method further comprising:
providing a physical random access channel (PRACH) preamble to the cellular base station, wherein the PRACH preamble is selected to indicate that the RRC connection is for frequent small data exchanges;
receiving a random access response from the cellular base station;
providing a RRC connection request message to the cellular base station; and
receiving a contention resolution message.

11. The method of claim 7, wherein the access stratum context information comprises one or more of:
Uu context information; and
data radio bearer information.

12. The method of claim 7, wherein the access stratum context information comprises one or more of:
S1-MME context information; and
S1-U bearer information.

13. The method of claim 7, wherein the indication to the cellular base station to store access stratum context information for the first RRC connection comprises one or more of:
inclusion of a specific cause value in an RRC connection request; and
use of a specific physical random access channel preamble value.

14. A method for operating a cellular base station, the method comprising: by the cellular base station:
establishing a first radio resource control (RRC) connection with a user equipment device (UE);
communicating data with the UE using the first RRC connection;
releasing the first RRC connection with the UE;
receiving an indication from the UE to store access stratum context information for the first RRC connection after the first RRC connection is released;
storing the access stratum context information for the first RRC connection with the UE is stored after releasing the first RRC connection in response to the indication; and establishing a second RRC connection with the UE using the stored access stratum context information, wherein RRC connection establishment security procedures when establishing the second RRC connection with the UE are avoided by utilizing the stored access stratum context information for the first RRC connection with the UE.

15. The method of claim 14, wherein the indication from the UE to store access stratum context information for the first RRC connection further causes one or more additional cellular network entities to store access stratum context information for the first RRC connection after the first RRC connection is released.

16. The method of claim 14, the method further comprising:
    receiving a physical random access channel preamble from the UE;
    providing a random access response to the UE;
    receiving a RRC connection request message from the UE, wherein the RRC connection request message comprises an indication that the RRC connection is for frequent small data exchanges; and
    providing a contention resolution message.

17. The method of claim 14, the method further comprising:
    receiving a physical random access channel (PRACH) preamble from the UE, wherein the PRACH preamble is selected to indicate that the RRC connection is for frequent small data exchanges;
    providing a random access response to the UE;
    receiving a RRC connection request message from the UE; and
    providing a contention resolution message.

18. The method of claim 14, wherein the access stratum context information comprises one or more of:
    Uu context information; and
    data radio bearer information.

19. The method of claim 14, wherein the access stratum context information comprises one or more of:
    S1-MME context information; and
    S1-U bearer information.

20. The method of claim 14, wherein the indication from the UE to store access stratum context information for the first RRC connection comprises one or more of:
    inclusion of a specific cause value in an RRC connection request; and
    use of a specific physical random access channel preamble value.

* * * * *